UNITED STATES PATENT OFFICE.

J. F. SHELDEN, OF POPE CREEK, ILLINOIS.

IMPROVEMENT IN REFINING SORGHUM JUICE AND SIRUP.

Specification forming part of Letters Patent No. 40,544, dated November 3, 1863; antedated September 23, 1863.

*To all whom it may concern:*

Be it known that I, J. F. SHELDEN, of Pope Creek, in the county of Mercer and State of Illinois, have invented a new and useful improvement in defecating sorghum or cane sirup and manufacturing it into sugar; and I do hereby declare that the following is a full, clear, and exact description thereof.

The nature of my invention consists in treating the cold juice or sirup with soda and cream of tartar or equivalent alkaline and acid substances and a small quantity of sweet milk in the order and manner hereinafter described.

To enable those skilled in the art to understand and make use of my invention, I will proceed to describe the same with particularity.

The juice is evaporated or cooked in any of the usual modes until it attains the condition and consistency of ordinary molasses, when it is taken off and allowed to become perfectly cool, which is essential to the successful operation of the process or treatment which follows. I then add to the cold sirup or molasses two table-spoonfuls of soda or saleratus for each gallon thereof, which is thoroughly diffused throughout the mass by stirring the same in any suitable manner. I then add for each gallon of the sirup one-fourth of a tea-spoonful of cream of tartar, which is also thoroughly mixed throughout the sirup, as before. I then add one gill of sweet milk to each gallon of the sirup, when the whole is again thoroughly stirred and mingled, as before specified. After the sirup has been treated with the above-mentioned substances in the manner described it is then set away in a warm room, where it should be thoroughly stirred and mingled, so as to bring the soda, cream of tartar, and milk in contact with all portions of the sirup daily for a week or ten days, at the end of which time the sirup will have entirely lost the greenish acrid taste which forms so great an objection to it, and at the end of from twenty or thirty days the greater part of the sirup will have granulated and become very fine and superior sugar.

The juice may also be treated in a similar manner before cooking; but it will generally be necessary to repeat the above-described treatment upon the sirup.

Having thus described my invention, I will now state what I claim as new and desire to secure by Letters Patent:

Treating sorghum or cane sirups successively with soda, cream of tartar, and milk by the process herein described, and for the purposes specified.

J. F. SHELDEN.

Witnesses:
W. E. MARRS,
L. L. COBURN.